United States Patent
Zhu et al.

(10) Patent No.: US 9,419,752 B2
(45) Date of Patent: Aug. 16, 2016

(54) TRANSMISSION OPPORTUNITY OPERATION OF UPLINK MULTI-USER MULTIPLE-INPUT-MULTIPLE-OUTPUT COMMUNICATION IN WIRELESS NETWORKS

(71) Applicant: SAMSUNG ELECTRONICS CO., LTD., Suwon, Gyeonggi-Do (KR)

(72) Inventors: Chunhui Zhu, San Jose, CA (US); Youngsoo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 277 days.

(21) Appl. No.: 14/023,195

(22) Filed: Sep. 10, 2013

(65) Prior Publication Data
US 2014/0269544 A1 Sep. 18, 2014

Related U.S. Application Data

(60) Provisional application No. 61/789,025, filed on Mar. 15, 2013.

(51) Int. Cl.
*H04B 7/04* (2006.01)
*H04L 1/16* (2006.01)
*H04L 1/18* (2006.01)
*H04L 1/00* (2006.01)

(52) U.S. Cl.
CPC ............ *H04L 1/1671* (2013.01); *H04L 1/1887* (2013.01); *H04B 7/0452* (2013.01); *H04L 2001/0093* (2013.01)

(58) Field of Classification Search
None
See application file for complete search history.

(56) References Cited

U.S. PATENT DOCUMENTS

| | | | |
|---|---|---|---|
| 5,615,212 | A | 3/1997 | Ruszczyk et al. |
| 5,886,993 | A | 3/1999 | Ruszczyk et al. |
| 6,198,728 | B1 | 3/2001 | Hulyalkar et al. |
| 6,795,421 | B1 | 9/2004 | Heinonen et al. |
| 6,807,158 | B2 | 10/2004 | Krishnamurthy et al. |
| 6,813,277 | B2 | 11/2004 | Edmon et al. |

(Continued)

OTHER PUBLICATIONS

IEEE P802.11e/D13.0, "IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications: Amendment: Medium Access Control (MAC) Quality of Service (QoS) Enhancements," LAN/MAN Committee, IEEE Computer Society, Jan. 2005, IEEE, New York, NY, pp. i-182, United States.

(Continued)

*Primary Examiner* — Ayaz Sheikh
*Assistant Examiner* — Tarell Hampton
(74) *Attorney, Agent, or Firm* — Sherman IP LLP; Kenneth L. Sherman; Steven Laut

(57) ABSTRACT

Wireless communication in a wireless network comprises a wireless station obtaining a transmission opportunity period (TXOP) for communicating with an access point (AP) over a wireless communication channel. The wireless station sends an announcement to the AP to share the transmission opportunity period with at least another wireless station, as a multi-user transmission opportunity period for simultaneously transmitting data from said wireless stations to the AP on multiple uplink (UL) spatial streams over the wireless channel. UL TXOP transmission information is communicated based on one or more indications included in a quality of service (QoS) data frame and a frame header.

29 Claims, 15 Drawing Sheets

(56) References Cited

U.S. PATENT DOCUMENTS

| | | | |
|---|---|---|---|
| 6,868,072 B1 | 3/2005 | Lin et al. | |
| 6,925,064 B2 | 8/2005 | Hester et al. | |
| 7,079,812 B2 | 7/2006 | Miller et al. | |
| 7,088,702 B2 | 8/2006 | Shvodian | |
| 7,127,254 B2 | 10/2006 | Shvodian et al. | |
| 7,184,767 B2 | 2/2007 | Gandolfo | |
| 7,197,025 B2 | 3/2007 | Chuah | |
| 7,251,235 B2 | 7/2007 | Wentink et al. | |
| 7,280,518 B2 | 10/2007 | Montano et al. | |
| 7,280,801 B2 | 10/2007 | Dahl | |
| 7,339,916 B2 | 3/2008 | Kwon et al. | |
| 7,356,341 B2 | 4/2008 | Nanda | |
| 7,359,398 B2 | 4/2008 | Sugaya | |
| 7,385,943 B2 | 6/2008 | Niddam | |
| 7,388,833 B2 | 6/2008 | Yuan et al. | |
| 7,400,899 B2 | 7/2008 | Shin et al. | |
| 7,447,174 B2 | 11/2008 | Joshi | |
| 7,447,180 B2 | 11/2008 | Jeong et al. | |
| 7,474,686 B2 | 1/2009 | Ho | |
| 7,480,266 B2 | 1/2009 | Murty et al. | |
| 7,486,650 B2 | 2/2009 | Trainin | |
| 7,539,930 B2 | 5/2009 | Ginzburg et al. | |
| 7,545,771 B2 | 6/2009 | Wentink et al. | |
| 7,561,510 B2 | 7/2009 | Imamura et al. | |
| 7,570,656 B2 | 8/2009 | Raphaeli et al. | |
| 7,590,078 B2 | 9/2009 | Nanda | |
| 7,623,542 B2 | 11/2009 | Yonge et al. | |
| 7,634,275 B2 | 12/2009 | Odman | |
| 7,664,030 B2 | 2/2010 | Sugaya | |
| 7,664,132 B2 | 2/2010 | Benveniste | |
| 7,680,150 B2 | 3/2010 | Liu et al. | |
| 7,684,380 B2 | 3/2010 | Odman | |
| 7,697,448 B2 | 4/2010 | Karaoguz | |
| 7,787,487 B2 | 8/2010 | Liu | |
| 7,804,804 B2 | 9/2010 | Sugaya et al. | |
| 7,860,054 B2 | 12/2010 | Benveniste | |
| 7,881,340 B2 | 2/2011 | Farrag et al. | |
| 7,924,805 B2 | 4/2011 | Nishibayashi et al. | |
| 7,944,897 B2 | 5/2011 | Shao et al. | |
| 7,974,261 B2 | 7/2011 | Lane et al. | |
| 8,068,449 B2 | 11/2011 | Benveniste | |
| 8,072,961 B2 | 12/2011 | Takano | |
| 8,089,946 B2 | 1/2012 | Broomer | |
| 8,107,424 B2 | 1/2012 | Li et al. | |
| 8,179,867 B2 | 5/2012 | Seok | |
| 8,194,626 B2 | 6/2012 | Moorti et al. | |
| 8,437,317 B2 | 5/2013 | Jang et al. | |
| 8,532,221 B2 | 9/2013 | Liu et al. | |
| 8,649,358 B2 | 2/2014 | Gong et al. | |
| 2003/0003905 A1 | 1/2003 | Shvodian | |
| 2003/0137970 A1 | 7/2003 | Odman | |
| 2003/0137993 A1 | 7/2003 | Odman | |
| 2003/0214967 A1 | 11/2003 | Heberling | |
| 2004/0047319 A1 | 3/2004 | Elg | |
| 2004/0214571 A1 | 10/2004 | Hong | |
| 2004/0218683 A1 | 11/2004 | Batra et al. | |
| 2004/0264475 A1 | 12/2004 | Kowalski | |
| 2005/0058151 A1 | 3/2005 | Yeh | |
| 2005/0130634 A1 | 6/2005 | Godfrey | |
| 2005/0135318 A1 | 6/2005 | Walton et al. | |
| 2005/0232275 A1 | 10/2005 | Stephens | |
| 2006/0002428 A1 | 1/2006 | Trainin | |
| 2006/0050742 A1 | 3/2006 | Grandhi et al. | |
| 2006/0166683 A1 | 7/2006 | Sharma et al. | |
| 2006/0176908 A1 | 8/2006 | Kwon et al. | |
| 2006/0193279 A1 | 8/2006 | Gu et al. | |
| 2007/0280180 A1 | 12/2007 | Dalmases et al. | |
| 2008/0159208 A1 | 7/2008 | Kloker et al. | |
| 2008/0279204 A1 | 11/2008 | Pratt, Jr. et al. | |
| 2009/0052389 A1 | 2/2009 | Qin et al. | |
| 2009/0086706 A1 | 4/2009 | Huang et al. | |
| 2009/0092086 A1 | 4/2009 | Lee et al. | |
| 2009/0275292 A1 | 11/2009 | Chang | |
| 2009/0285163 A1 | 11/2009 | Zhang et al. | |
| 2009/0305734 A1* | 12/2009 | Toshimitsu et al. | 455/509 |
| 2009/0323611 A1 | 12/2009 | Singh et al. | |
| 2010/0002639 A1 | 1/2010 | Qin et al. | |
| 2010/0046453 A1 | 2/2010 | Jones, IV et al. | |
| 2010/0046518 A1 | 2/2010 | Takagi et al. | |
| 2010/0220601 A1 | 9/2010 | Vermani et al. | |
| 2010/0220678 A1* | 9/2010 | Wentink | 370/329 |
| 2010/0220679 A1* | 9/2010 | Abraham et al. | 370/329 |
| 2010/0310003 A1 | 12/2010 | Lauer et al. | |
| 2011/0002319 A1 | 1/2011 | Husen et al. | |
| 2011/0064013 A1 | 3/2011 | Liu et al. | |
| 2011/0090855 A1 | 4/2011 | Kim | |
| 2011/0176627 A1 | 7/2011 | Wu et al. | |
| 2011/0235513 A1 | 9/2011 | Ali | |
| 2011/0255618 A1 | 10/2011 | Zhu et al. | |
| 2011/0268054 A1 | 11/2011 | Abraham et al. | |
| 2011/0317630 A1 | 12/2011 | Zhu et al. | |
| 2012/0008490 A1 | 1/2012 | Zhu | |
| 2012/0060075 A1* | 3/2012 | Gong et al. | 714/776 |
| 2012/0082200 A1 | 4/2012 | Verikoukis et al. | |
| 2012/0087358 A1 | 4/2012 | Zhu et al. | |
| 2012/0140615 A1 | 6/2012 | Gong | |
| 2012/0218947 A1 | 8/2012 | Merlin et al. | |
| 2012/0314694 A1 | 12/2012 | Hsieh | |
| 2013/0229996 A1* | 9/2013 | Wang et al. | 370/329 |
| 2013/0259017 A1 | 10/2013 | Zhang et al. | |
| 2013/0286959 A1* | 10/2013 | Lou et al. | 370/329 |
| 2013/0301551 A1 | 11/2013 | Ghosh et al. | |
| 2014/0010144 A1 | 1/2014 | Liu et al. | |
| 2014/0119288 A1 | 5/2014 | Zhu et al. | |
| 2014/0126509 A1* | 5/2014 | You | 370/329 |
| 2014/0328262 A1 | 11/2014 | Sampath et al. | |
| 2015/0071051 A1 | 3/2015 | Zhu et al. | |

OTHER PUBLICATIONS

IEEE Wireless LAN Edition, "A Compilation Based on IEEE Std. 802.11TM-1999 (R2003) and Its Amendments," IEEE Press, 2003, pp. i-678, United States.

Mujtaba, S.A., "TGn Sync Proposal Technical Specification," IEEE 802.11-04-0889r7, IEEE P802.11: Wireless LANs, Jul. 8, 2005, pp. 1-133, United States.

Kim, S. et al., "QoS Enhancement Scheme of EDCF in IEEE 802.11e Wireless LANs," Electronics Letters, vol. 40, No. 17, IEEE, Aug. 19, 2004, pp. 1091-1092, United States.

IEEE 802.11-2007, "IEEE Standard for Information Technology—Telecommunications and Information Exchange Between Systems—Local and Metropolitan Area Networks—Specific requirements: Part 11: Wireless LAN Medium Access Control (MAC) and Physical Layer (PHY) Specifications," 2007 Revision of IEEE Std 802.11-1999, IEEE Computer Society, Jun. 12, 2007, pp. i-1184, United States.

International Search Report dated Jan. 9, 2009 for International Application No. PCT/KR2008/004793 from Korean Intellectual Property Office, filed Aug. 19, 2008, pp. 1-2, Seo-gu, Daejeon, Republic of Korea.

Harada, H., "Unified and Flexible Millimeter Wave WPAN Systems Supported by Common Mode," IEEE P802.15 Working Group for Wireless Personal Area Networks (WPANs), IEEE 802.15-07-0761-10-003c, Sep. 18, 2007, Slides 1-62, United States.

Mirkovic, J. et al., "A MAC Protocol With Multi-User MIMO Support for Ad-Hoc WLANs", The 18th Annual IEEE International Symposium on Personal, Indoor and Mobile Radio Communications (PIMRC'07), IEEE, 2007, pp. 1-5, United States.

Stacey, R. et al., "DL MU-MIMO Ack Protocol (IEEE 802.11-09/1172r0)", IEEE, Nov. 16, 2009, pp. 1-8, United States.

IEEE Computer Society, "IEEE Std 802®-2001 (R2007), IEEE Standard for Local and Metropolitan Area Networks: Overview and Architecture", IEEE, Feb. 7, 2002, pp. i-36, New York, United States.

Camp, J.D. et al., "The IEEE 802.11s Extended Service Set Mesh Networking Standard", IEEE Communications Magazine, vol. 46, No. 8, IEEE, Aug. 2008, pp. 1-6, United States.

Morioka, Y. et al., "Multi-RTS Proposal", IEEE 802.11-10/1124r01, Sep. 12, 2010, Slides 1-14, IEEE, USA.

U.S. Non-Final Office Action mailed Oct. 26, 2011 for U.S. Appl. No. 12/455,438.

(56) References Cited

OTHER PUBLICATIONS

U.S. Final Office Action mailed Apr. 12, 2012 for U.S. Appl. No. 12/455,438.
U.S. Non-Final Office Action mailed Jul. 11, 2013 for U.S. Appl. No. 12/455,438.
U.S. Notice of Allowance mailed Oct. 21, 2013 for U.S. Appl. No. 12/455,438.
U.S. Non-Final Office Action mailed Jun. 6, 2012 for U.S. Appl. No. 12/415,981.
U.S. Final Office Action mailed Dec. 19, 2012 for U.S. Appl. No. 12/415,981.
U.S. Advisory Action mailed Mar. 8, 2013 for U.S. Appl. No. 12/415,981.
U.S. Non-Final Office Action mailed Aug. 8, 2013 for U.S. Appl. No. 12/415,981.
U.S. Final Office Action mailed Jan. 14, 2014 for U.S. Appl. No. 12/415,981.
U.S. Notice of Allowance mailed Apr. 10, 2014 for U.S. Appl. No. 12/415,981.
U.S. Non-Final Office Action mailed Jun. 9, 2009 for U.S. Appl. No. 11/589,519.
U.S. Final Office Action mailed May 12, 2010 for U.S. Appl. No. 11/589,519.
U.S. Notice of Allowance mailed Jan. 24, 2011 for U.S. Appl. No. 11/589,519.
U.S. Non-Final Office Action mailed Jun. 27, 2006 for U.S. Appl. No. 11/044,600.
U.S. Non-Final Office Action mailed Aug. 21, 2007 for U.S. Appl. No. 11/044,600.
U.S. Final Office Action mailed Jan. 15, 2008 for U.S. Appl. No. 11/044,600.
U.S. Non-Final Office Action mailed Aug. 7, 2008 for U.S. Appl. No. 11/044,600.
U.S. Non-Final Office Action mailed Jan. 25, 2007 for U.S. Appl. No. 11/044,600.
U.S. Advisory Action mailed May 15, 2008 for U.S. Appl. No. 11/044,600.
U.S. Restriction Requirement for U.S. Appl. No. 13/030,070 mailed Nov. 5, 2013.
U.S. Non-Final Office Action for U.S. Appl. No. 13/030,070 mailed May 15, 2014.
U.S. Non-Final Office Action for U.S. Appl. No. 13/177,386 mailed Dec. 17, 2013.
U.S. Non-Final Office Action for U.S. Appl. No. 12/821,940 mailed May 29, 2012.
U.S. Final Office Action for U.S. Appl. No. 12/821,940 mailed Aug. 21, 2012.
U.S. Non-Final Office Action for U.S. Appl. No. 12/821,940 mailed Jun. 24, 2014.
U.S. Notice of Allowance for U.S. Appl. No. 12/821,940 mailed Oct. 31, 2014.
U.S. Supplemental Notice of Allowability for U.S. Appl. No. 12/821,940 mailed Dec. 8, 2014.
U.S. Supplemental Notice of Allowability for U.S. Appl. No. 12/821,940 mailed Dec. 19, 2014.
U.S. Restriction Requirement for U.S. Appl. No. 13/253,926 mailed Oct. 10, 2013.
U.S. Non-Final Office Action for U.S. Appl. No. 13/253,926 mailed Nov. 25, 2013.
U.S. Final Office Action for U.S. Appl. No. 13/253,926 mailed Apr. 29, 2014.
U.S. Advisory Action for U.S. Appl. No. 13/253,926 mailed Jul. 11, 2014.
U.S. Notice of Allowance for U.S. Appl. No. 13/253,926 mailed Aug. 15, 2014.
U.S. Supplemental Notice of Allowability for U.S. Appl. No. 13/253,926 mailed Oct. 15, 2014.
U.S. Supplemental Notice of Allowability for U.S. Appl. No. 13/253,926 mailed Nov. 26, 2014.
U.S. Non-Final Office Action U.S. Appl. No. 13/664,602 mailed Feb. 18, 2015.
U.S. Non-Final Office Action for U.S. Appl. No. 14/023,204 mailed Mar. 11, 2015.
U.S. Final Office Action U.S. Appl. No. 13/664,602 mailed May 28, 2015.
U.S. Final Office Action for U.S. Appl. No. 14/023,204 mailed Jul. 23, 2015.
U.S. Notice of Allowance for U.S. Appl. No. 14/023,204 mailed Oct. 16, 2015.
U.S. Notice of Allowance U.S. Appl. No. 13/664,602 mailed Sep. 2, 2015.

* cited by examiner

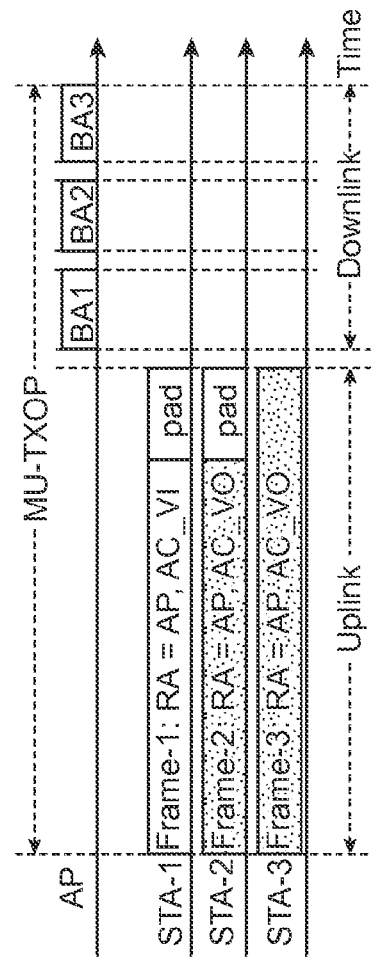
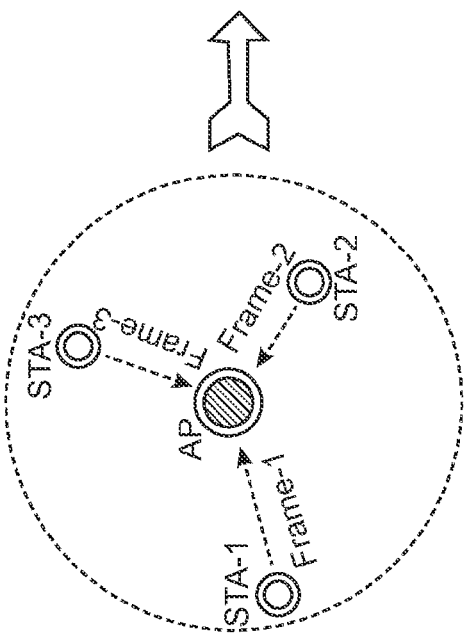
FIG. 1B
FIG. 1A

| Applicable frame (sub) types | Bits 0-3 | Bit 4 | Bits 5-6 | Bit 7 | Bit 8 | Bit 9 | Bit 10 | Bits 11-15 |
|---|---|---|---|---|---|---|---|---|
| QoS Data and QoS Data+CF-Ack frames sent by non-AP STAs(11n) that are not a (#11082)TPU buffer STA or a (#11082)TPU sleep STA(11z) in a non-mesh BSS(11s) | TID | 0 | Ack Policy | A-MSDU Present | TXOP Duration Requested | | | |
| | TID | 1 | Ack Policy | A-MSDU Present | Queue Size | | | |
| QoS Null frames sent by non-AP STAs(11n) that are not a (#11082)TPU buffer STA or a (#11082)TPU sleep STA(11z) in a non-mesh BSS(11s) | TID | 0 | Ack Policy | Reserved | TXOP Duration Requested | | | |
| | TID | 1 | Ack Policy | Reserved | Queue Size | | | |

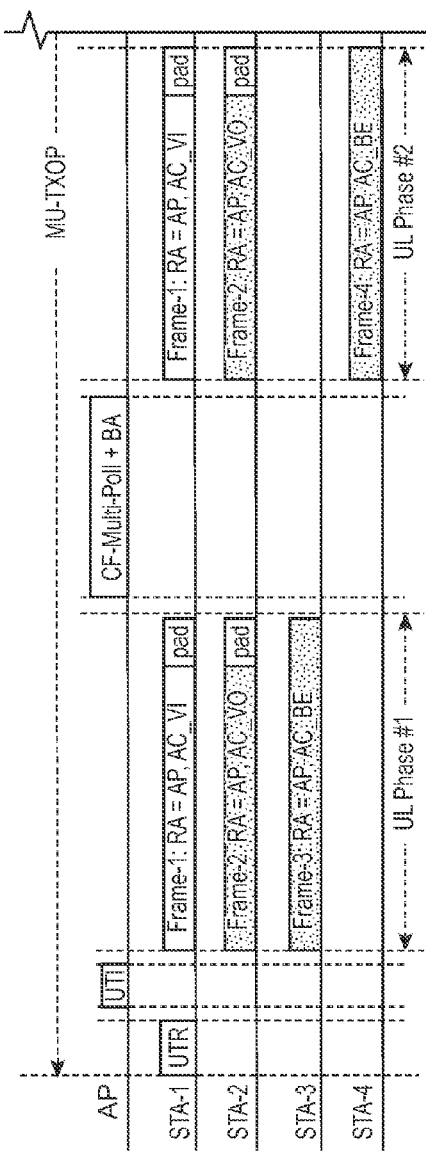
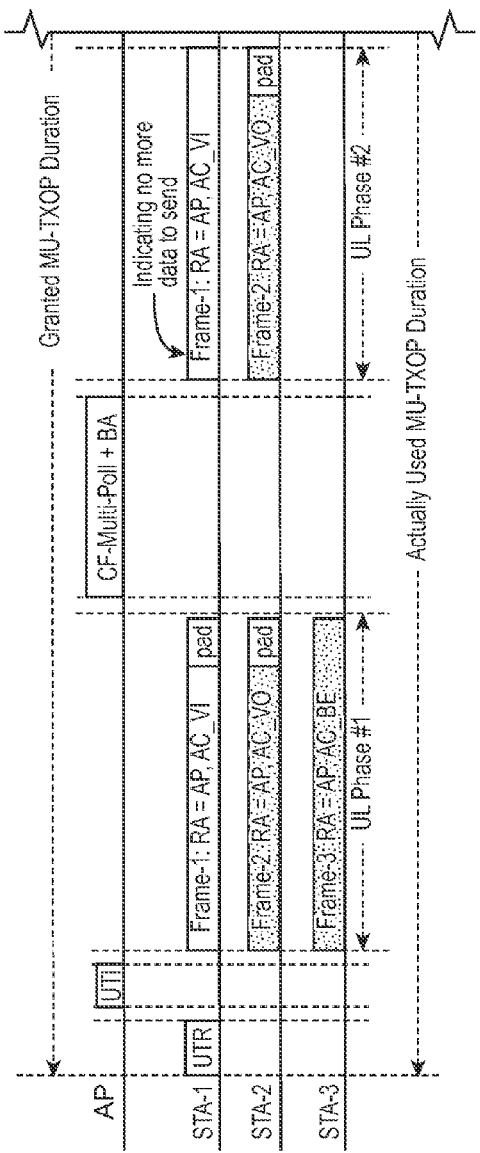

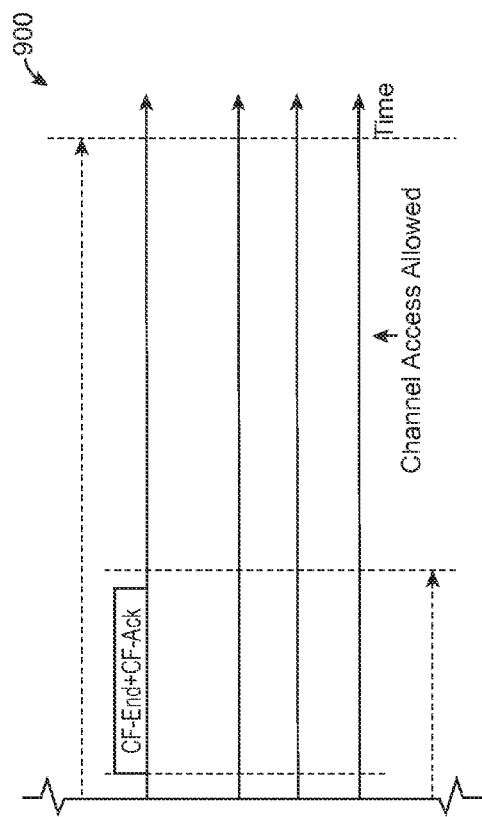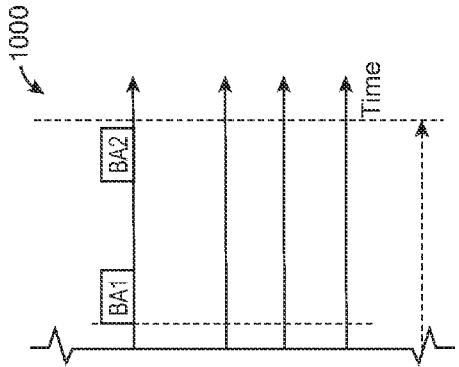

TRANSMISSION OPPORTUNITY OPERATION OF UPLINK MULTI-USER MULTIPLE-INPUT-MULTIPLE-OUTPUT COMMUNICATION IN WIRELESS NETWORKS

CROSS-REFERENCE TO RELATED APPLICATIONS

This application claims the priority benefit of U.S. Provisional Patent Application Ser. No. 61/789,025, filed Mar. 15, 2013, incorporated herein by reference in its entirety.

TECHNICAL FIELD

One or more embodiments relate generally to wireless networks, and in particular, to transmission opportunity operation of uplink multi-user multiple-input-multiple-output communication in wireless networks.

BACKGROUND

In a typical wireless network utilizing a coordination function for coordinating transmissions among wireless stations, such a function may be implemented in one of the wireless stations or a coordinator device such as an access point (AP). The wireless stations may communicate via directional transmissions using sector antennas and beamforming antenna arrays. The coordinator device may use omnidirectional transmissions for broadcasts to all wireless stations in all directions (e.g., 360 degrees range). Alternatively, the coordinator may use quasi-omnidirectional transmissions for broadcasts to a wide range, but not necessarily in all directions. In many wireless area networks (WLANs) such as those according to IEEE 802.11 standards, a coordinator station in infrastructure mode is used for providing contention-free access to a wireless communication medium to support Quality of Service (QoS) for certain applications.

In the absence of a coordinator, to provide contention-free channel time reservation, existing techniques use announcement or information exchange among wireless stations in a network to negotiate/reserve the use of the communication medium. For example, IEEE 802.11e Enhanced Distributed Channel Access (EDCA) provides QoS support for certain applications using announcement or information exchange. EDCA defines four Access Categories (ACs) and introduces service differentiation such that certain data traffic uses higher priority parameters to contend for the communication medium.

Further, a frame structure is used for data transmission between wireless stations such as a transmitter station and a receiver station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission of a frame from the transmitter station to the receiver station, a preamble is attached to the PPDU, wherein the preamble can include channel estimation and synchronization information.

EDCA allows contention for transmission opportunities (TXOPs), wherein a TXOP is a time interval when a quality of service (QoS) wireless station (STA) may initiate exclusive frame transfer on the wireless medium (e.g., wireless channel). The TXOP may be assigned to the wireless station by a coordinator, or the wireless station may obtain the TXOP by successfully contending for the wireless channel.

SUMMARY

One or more embodiments relate to a wireless communication in a wireless network. In one embodiment, a method for wireless communication comprises a wireless station that obtains a transmission opportunity (TXOP) period for communicating with an access point (AP) over a wireless communication channel. The wireless station sends an announcement to the AP to share the transmission opportunity period with at least another wireless station, as a multi-user transmission opportunity period for simultaneously transmitting data from said wireless stations to the AP on multiple uplink (UL) spatial streams over the wireless channel. Transmission information is communicated in one or more indications included in a quality of service (QoS) data frame and a frame header.

In one embodiment, a wireless station comprises a Physical Layer (PHY) for wireless communication over a wireless communication channel, a Media Access Control (MAC) layer, and a channel access module that obtains a transmission opportunity period (TXOP) for communicating with an AP over a wireless communication channel. In one embodiment, the channel access module sends an announcement to the AP to share the transmission opportunity period with at least another wireless station as a multi-user transmission opportunity period for simultaneously transmitting data from said wireless stations to the AP on multiple uplink (UL) spatial streams over the wireless channel. Indications of queue size and/or requested TXOP duration are included in the frame header of each quality of service (QoS) data frame. The indications information helps the AP decide which STA to poll for UL transmission.

In one embodiment, a wireless AP comprises a Physical Layer (PHY) for wireless communication over a wireless communication channel, and a Media Access Control (MAC) layer that manages simultaneous transmissions from multiple wireless stations to the access point on multiple uplink (UL) spatial streams during a multi-user transmission opportunity period over a wireless channel. In one embodiment, the AP receives transmission information in one or more indications included in a quality of service (QoS) data frame and a frame header.

These and other features, aspects and advantages of the one or more embodiments will become understood with reference to the following description, appended claims and accompanying figures.

BRIEF DESCRIPTION OF THE DRAWINGS

FIG. 1A shows a diagram of a wireless system implementing multi-user transmit opportunity (MU-TXOP) for wireless uplink multi-user multiple-input-multiple-output (UL MU-MIMO) communication, according to an embodiment.

FIG. 1B shows a process for UL MU-MIMO communication in FIG. 1A, according to an embodiment.

FIG. 4 shows an example format for a QoS control field, according to an embodiment.

DETAILED DESCRIPTION

Figure 2A:
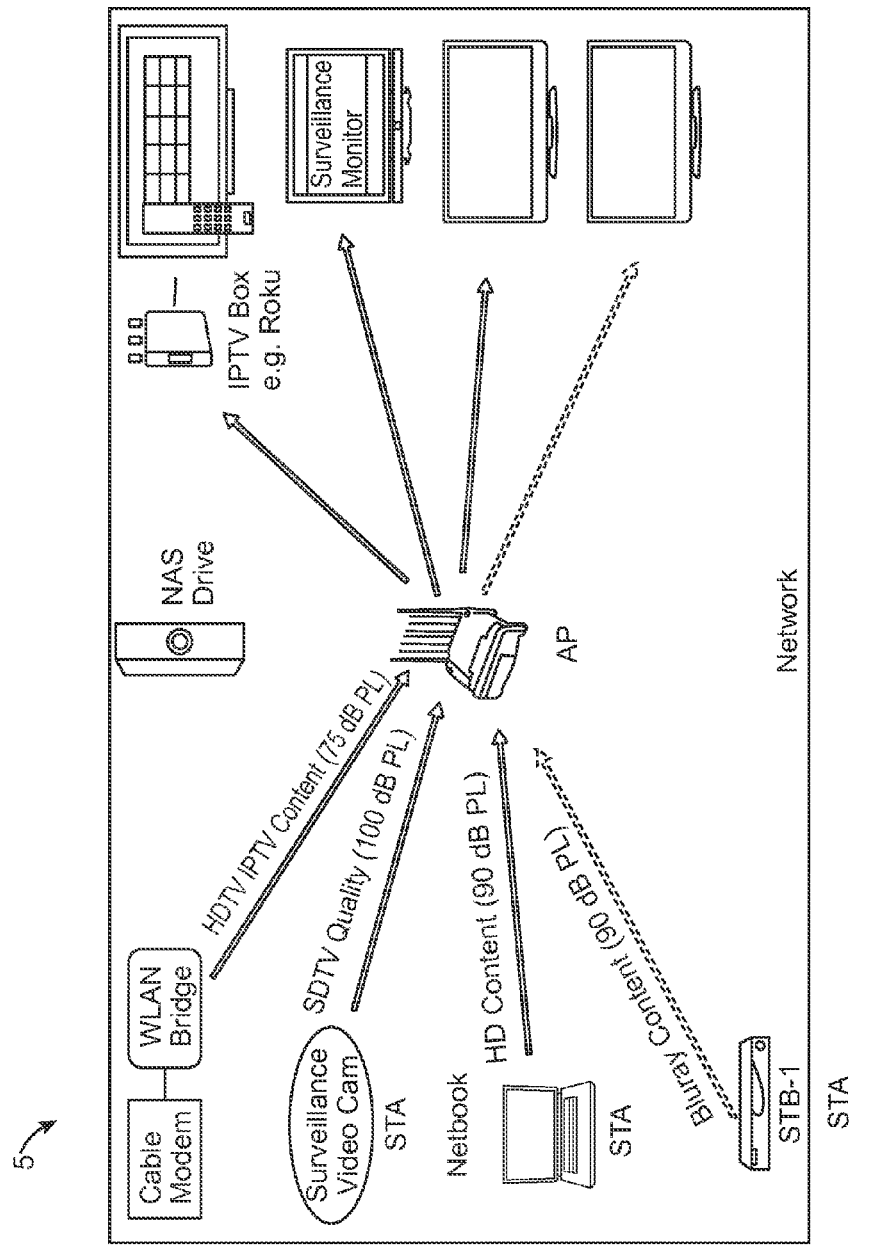
FIG. 2A shows an example wireless network implementing UL MU-MIMO communication, according to an embodiment.

One or more embodiments relate to uplink (UL) multi-user multiple-input-multiple-output (MU-MIMO) communication in wireless networks. One or more embodiments allow simultaneously transmitting multiple uplink spatial streams from multiple wireless stations to an access point (AP) during a multi-user transmit opportunity over a wireless medium, such as a shared wireless radio frequency (RF) channel. One or more embodiments are further useful with simultaneously transmitting multiple downlink spatial streams to multiple wireless stations from the AP during a multi-user transmit opportunity over a wireless medium. One or more embodiments employ a multi-user transmit opportunity (MU-TXOP) mechanism for a wireless network to support multiple traffic streams for multiple wireless stations simultaneously. In one or more embodiments, UL TXOP transmission information is communicated based on one or more indications included in a quality of service (QoS) data frame and a frame header.

In one embodiment, wireless channel access protocols and a mechanism establish the UL MU-MIMO transmission. The channel access protocols extend the existing WLAN (IEEE 802.11) standard to support uplink MU-MIMO transmission (i.e., multiple stations sending data frames to an access point).

One embodiment provides a MAC protocol for enabling UL MU-MIMO transmissions. According to an embodiment, RTS/CTS frame exchanges are provided for initiating UL MU-MIMO transmissions. According to an embodiment, an ultra-high throughput (UHT) control wrapper frame with RTS/CTS frames is provided for initiating UL MU-MIMO transmissions. According to an embodiment, uplink transmission request (UTR) and uplink transmission indication (UTI) frames are provided for initiating UL MU-MIMO transmissions.

Uplink multi-user MIMO (UL MU-MIMO) protocol allows multiple traffic streams to be transmitted from different wireless stations (STAs) to a single access point (AP) simultaneously via multiple spatial streams, through the use of smart antennas and beamforming technology.

FIG. 1A illustrates an example in which three non-AP STAs transmit to one AP STA simultaneously. Specifically, FIG. 1A illustrates an uplink transmission involving multi-user MIMO transmission of frames Frame-1, Frame-2, Frame-3 from wireless stations STA-1, STA-2, STA-3 to an AP station during a MU-TXOP, respectively, via multi-path directional transmissions, according to an embodiment.

FIG. 1B shows a timing diagram for the example communication in FIG. 1A, wherein during a MU-TXOP, in an uplink (UL) phase, wireless stations STA-1, STA-2, STA-3 simultaneously and directionally transmit the three frames Frame-1, Frame-2, Frame-3 to the AP station respectively. Each of the frames Frame-1, Frame-2, Frame-3 includes a receiver address (RA) set to the AP station address. In a downlink phase, the AP station sends a block acknowledgement (BA) to each of the wireless stations STA-1, STA-2, STA-3 (i.e., BA1, BA2, BA3).

All three stations, STA-1 to STA-3, transmit at the same time to the AP through different spatial streams. Control and management frame exchanges are omitted for ease of illustration. The sequential acknowledgement scheme from the AP station shown in FIG. 1B is only one example of different acknowledgement scheme options.

FIG. 2A shows an example application of uplink MU-MIMO communication in a WLAN network 5, according to an embodiment. The network includes an AP station and several small-form-factor devices (i.e., STAs) that can only support 1-2 spatial streams. Such devices include, but not limited to, smartphones, netbooks, tablets, cameras, camcorders, multimedia players, video surveillance cameras, etc. Example applications of uplink MU-MIMO cover home network, enterprise, and hotspot scenarios.

As used herein, the term "UHT-capable device/STA" means a device/STA capable of performing uplink MU-MIMO communication functions. Enabling UL MU-MIMO transmission includes time synchronization, frequency synchronization, power control, enhanced AP capability, and enhanced MAC protocol. One or more embodiments provide enhanced TXOP sharing and operating rules for extending existing IEEE 802.11 MAC protocol, in order to support UL MU-MIMO transmissions. One or more embodiments address how to maintain fairness among STAs running EDCA protocol; how to inform the AP when a STA has uplink traffic to send to the AP; how to transmit multiple frames during an uplink TXOP; how to terminate an uplink TXOP when the TXOP owner STA has no more data to send; how to extend an uplink TXOP when the TXOP owner STA cannot finish transmission during the initially requested TXOP durations and the TXOP limited has not reached; and how to set network allocation vectors (NAVs) in different STAs in the basic service set (BSS).

According to one or more embodiments, a protocol for enabling UL MU-MIMO transmissions operate in the EDCA mode. Under EDCA operation rules, each STA contends for channel access using a distributed algorithm (i.e., CSMA/CA and a serial of channel access rules). The EDCA operation rules remain the same for UL MU-MIMO as in the current IEEE 802.11 standards, and therefore not detailed further herein.

Initiation Process for UL MU-MIMO Transmission

Figure 2B:
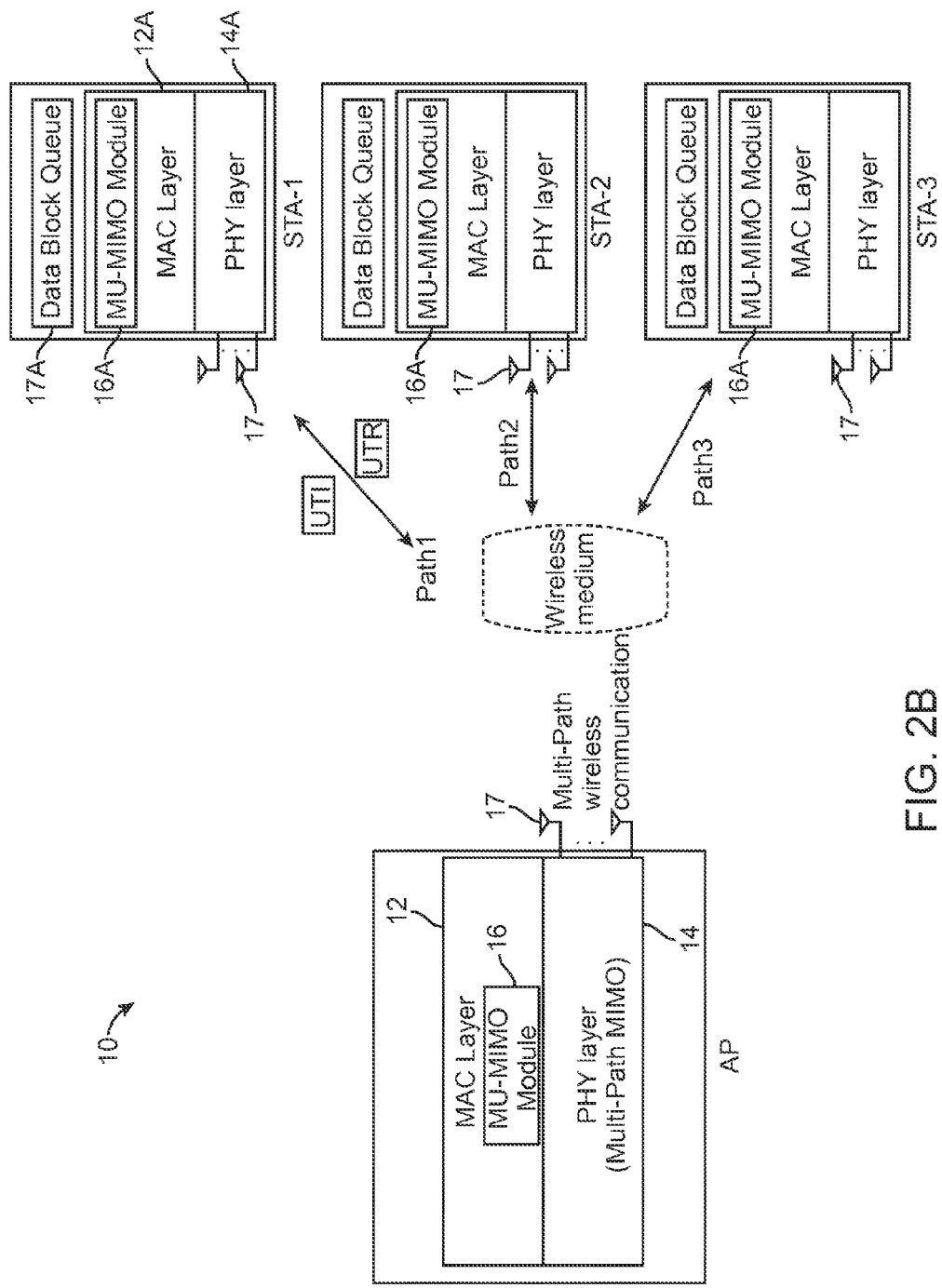
FIG. 2B shows a block diagram of a wireless network UL MU-MIMO communication, according to an embodiment.

FIG. 2B shows a wireless network 10, according to an embodiment. The wireless network comprises a wireless local area network (WLAN) comprising multiple wireless devices including STA-1, STA-2, STA-3 and AP. The AP manages simultaneous transmissions from multiple wireless stations to the access point on multiple uplink (UL) spatial streams during a multi-user transmission opportunity period over a wireless channel. The AP includes a MAC layer 12 and a PHY layer 14, wherein the MAC layer 12 includes a channel access module implemented as a MU-MIMO module 16 that provides EDCA MU-MIMO communication including UL MU-MIMO, according to an embodiment. Each of the wireless devices STA-1, STA-2, STA-3 includes a MAC layer 12A and a PHY layer 14A. Each STA MAC layer 12A includes a channel access module implemented as MU-MIMO module 16A that provides UL MU-MIMO, according to an embodiment.

Figure 2C:
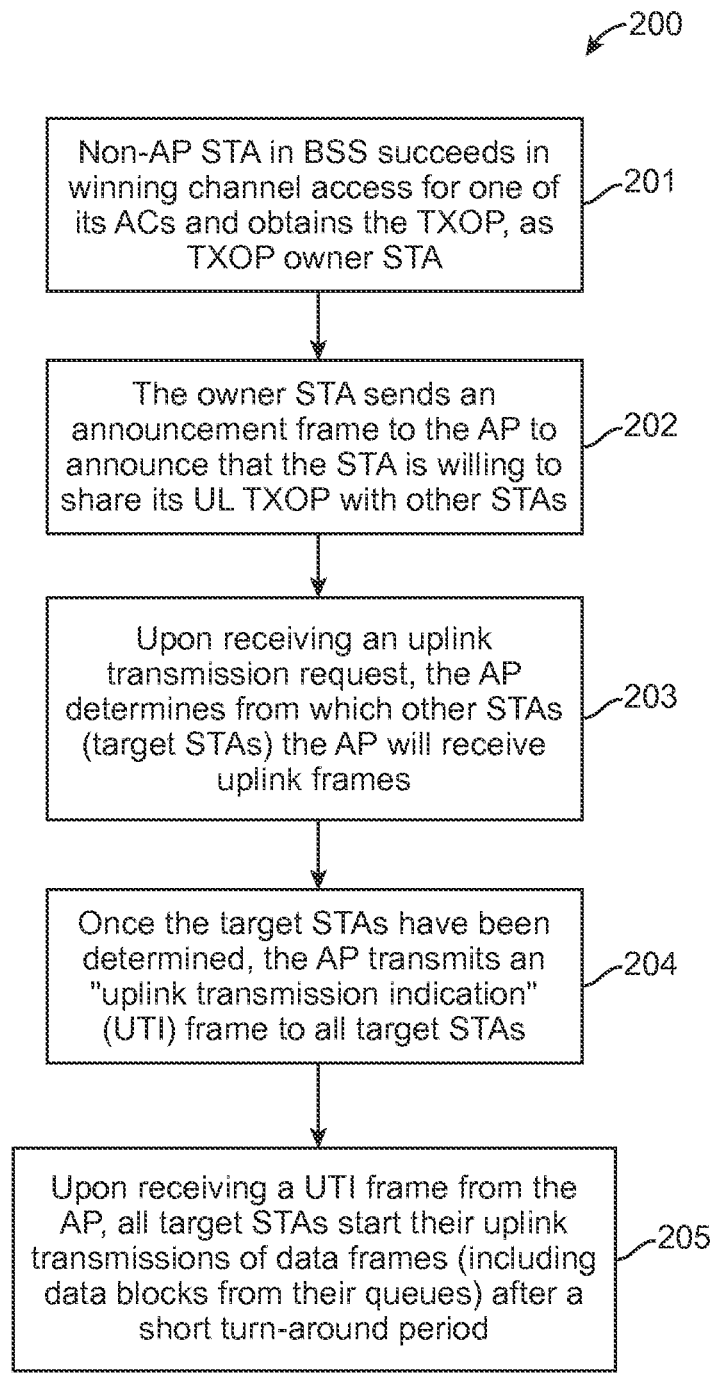
FIG. 2C shows an example uplink MU-MIMO process, according to an embodiment.

FIG. 2C shows an example uplink MU-MIMO process 200, according to an embodiment. The process 200 comprises process blocks described below. Process block 201: An initiation process includes a frame exchange process before any user data can be transferred in UL MU-MIMO communication. An initiation of the MU-TXOP occurs when the EDCA rules permit access to the medium. An initiation process begins with one of the non-AP STAs in BSS succeeding in winning channel access for one of its ACs and obtains the TXOP. This STA becomes the TXOP owner STA.

Process block 202: The owner STA sends an announcement frame to the AP to announce that the STA is willing to share its UL TXOP with other STAs. Because the STA is the owner of the TXOP, it need not request the right for transmission since the STA has the right to transmit already. The purpose of the announcement is to inform the AP that the STA is willing to share the UL TXOP with other STAs. Along with the announcement frame, additional information including the following is provided to the AP: (1) The requested TXOP duration and (2) The AC of the winning EDCAF (this information provides the AP the maximum TXOP duration that can be granted to the TXOP owner). The announcement frame may also be treated as the TXOP owner's request to the AP to start a UL MU-MIMO transmission. Accordingly, the announcement frame is called an "uplink transmission request" (UTR) herein.

Process block 203: Upon receiving the uplink transmission request, the AP determines from which other STAs (i.e., target STA) the AP will receive uplink frames. The determination may be made based on each STA's request of TXOP duration and their queue size. The queue's size indicates the number of frames in transmission queue 17A (FIG. 2B) of data blocks each STA. This information is delivered to the AP via QoS control field carried in uplink QoS data frames sent earlier.

Process block 204: Once the targeted STAs have been determined, the AP transmits an "uplink transmission indication" (UTI) frame to all targeted STAs with the following information: (1) A list of addresses of STAs that are allowed to transmit in the uplink phase during the MU-TXOP uplink phase and (2) the allowed uplink transmission time for each target STA.

Process block 205: Upon receiving a UTI frame from the AP, all target STAs in the address list start their uplink transmissions of data frames (including data blocks from their queues) immediately after a short turn-around period, such as Short Interframe Space (SIFS) period. The SIFS period is to ensure the STA uplink transmissions to the AP during the uplink phase of the MU-TXOP are synchronized in time so that the AP can correctly decode the data carried in the uplink data frames belonging to each target STA.

In the example shown in FIG. 2B, there are buffered data in the Data Block Queue 17A in all three stations STA-1, STA-2, and STA-3. During an UL MU-TXOP multiple traffic streams belonging to the same or different access categories from multiple wireless stations STA-1, STA-2, and STA-3 are transmitted simultaneously over a wireless medium over multiple wireless paths Path1, Path2, Path3. The AP and all three stations implement MU-MIMO over multiple antennas 17 (FIG. 2B).

A primary aspect of the general initiation process described above comprises exchange of the UTR and UTI frames. In a preferred embodiment, a UTR/UTI frame exchange protocol includes considerations of the following factors:

Transmission reliability—the AP needs to receive the UTR frame reliably and all STAs need to receive the UTI frame reliably.

Backward compatibility—legacy STAs do not need to act on the UTR/UTI frames but they need to be able to set their NAV values correctly.

Control overhead—UTR/UTI frames are transmitted at the basic-MCS data rates to reduce overhead.

As used herein, the acronyms UTR and UTI also refer to the functions of certain frames and also refer to concrete frame formats (e.g. in the third example).

Figure 3A:
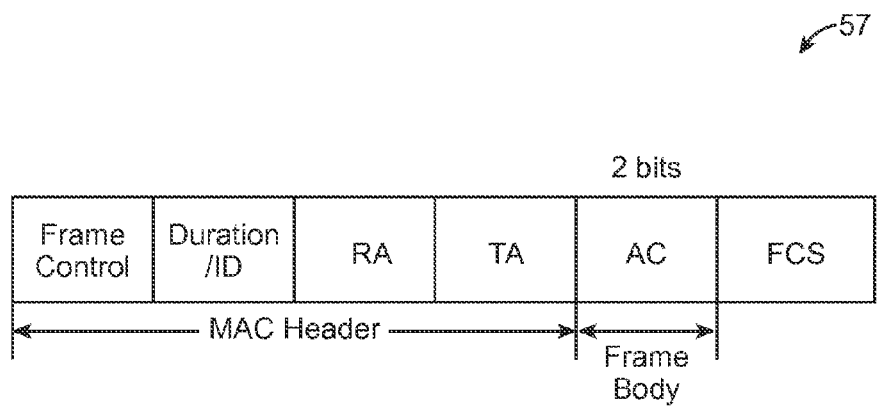
FIG. 3A shows an uplink transmission request (UTR) control frame for UL MU-MIMO communication, according to an embodiment.
Figure 3B:
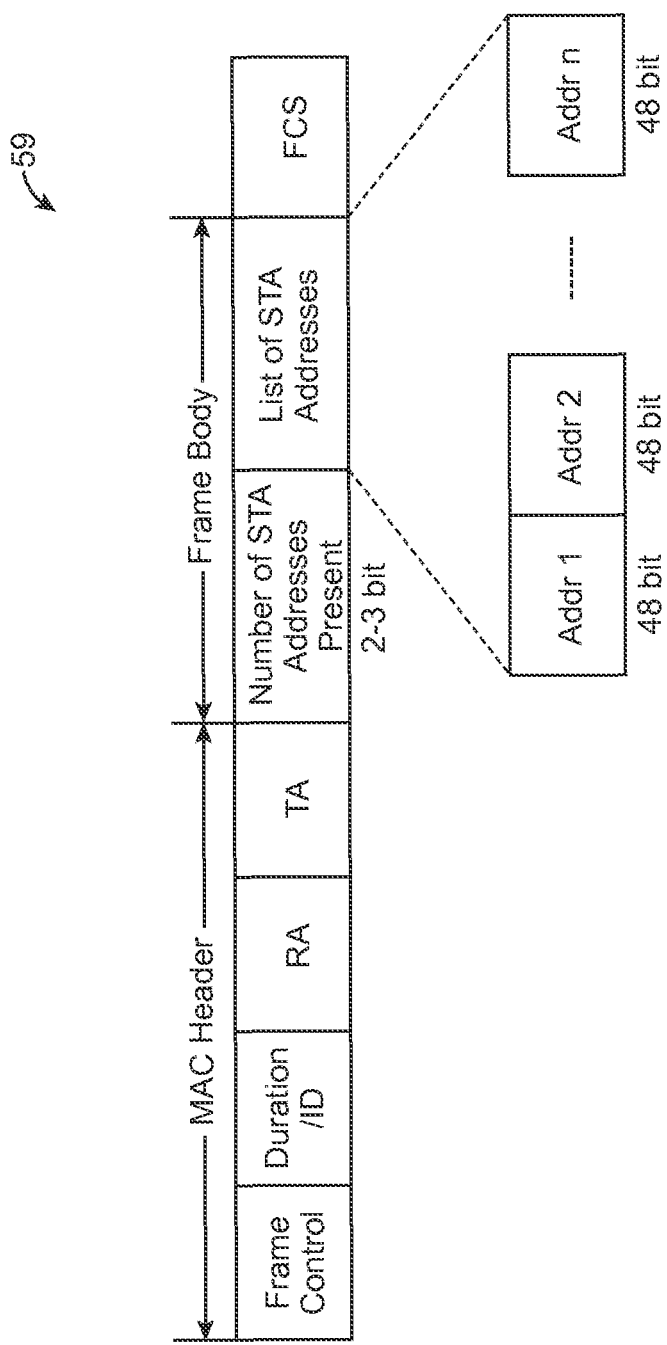
FIG. 3B shows an uplink transmission indication (UTI) control frame for UL MU-MIMO communication, according to an embodiment.

Initiation Process for UL MU-MIMO Transmission Using a Pair of Control Frames, UTR/UTI One example embodiment initiation process for UL MU-MIMO transmission includes using two control frames, UTR and UTI control frames. FIG. 3A illustrates a UTR control frame 57 and FIG. 3B illustrates a UTI control frame 59, according to an embodiment. A UTR frame 57 is generated by a STA that has won the channel access and is sent to the AP. In a UTR frame 57, the Duration/ID field indicates the requested TXOP duration plus any control overheads. The RA field contains the MAC address of the AP. And the Transmitter Address (TA) field contains the MAC address of the TXOP owner. The AC field in the frame body indicates the AC that wins the TXOP.

A UTI frame 59 is generated by the AP upon receiving the UTR and sent to the UTR sender, with other receiver addresses in the frame body. In a UTI frame 59, the Duration/ID field indicates the granted uplink TXOP duration plus any control overheads. The RA field contains the MAC address of the UTR sender. The Number of STA Addresses Present field indicates the number of STA addresses to be presented in the List of STA Addresses field. And the List of STA Addresses field contains the MAC addresses of the targeted STAs. To save control overhead, all 48-bit MAC addresses in the List of STA Addresses field may be replaced by 11-bit AID fields.

Figure 3C:
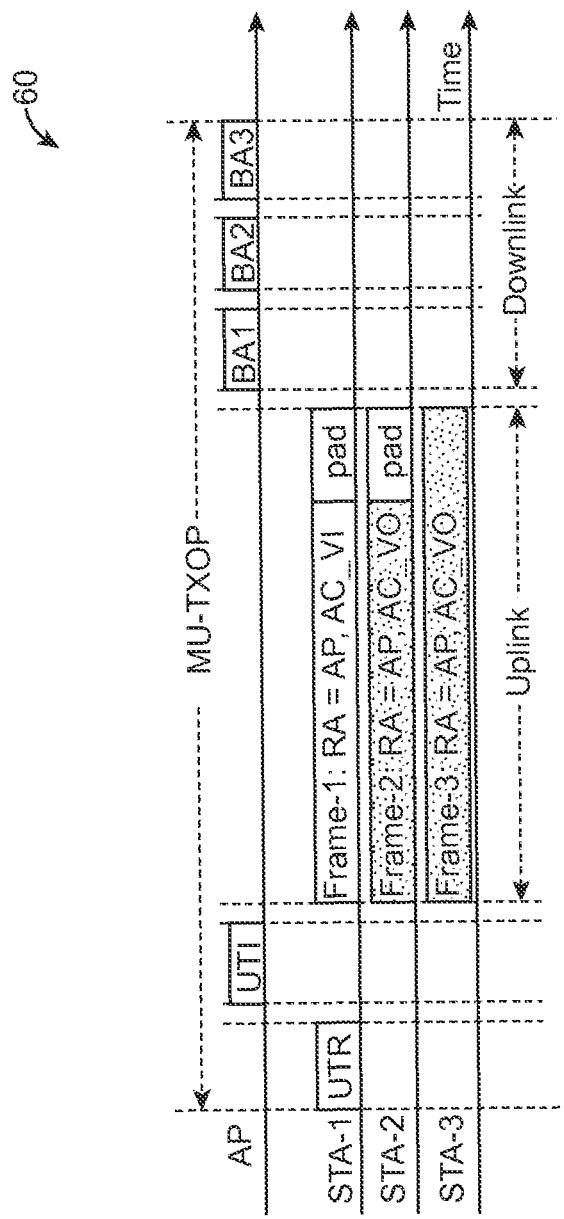
FIG. 3C shows an example initiation process for UL MU-MIMO communication, according to an embodiment.

FIG. 3C illustrates an exchange process 60 based on FIG. 1B, using the UTR and UTI control frames, for UL MU-MIMO communication according to one embodiment.

General UL MU-MIMO TXOP Operation Rules in the Enhanced Distributed Channel Access (EDCA) Environment EDCA is the mandatory operating model in WLAN. In one embodiment, to maintain consistency and fairness of the EDCA channel access mechanism, the following general TXOP operating rules in UL MU-MIMO transmissions are defined. In one embodiment, the AP shall always grant the TXOP owner the duration it requested, as long as the requested duration does not exceed the limit of the specific AC. Note this is different from the case when the BSS is running in the hybrid coordination function (HCF) controlled channel access (HCCA) environment. In the HCCA case, the AP has the right not to grant the required TXOP duration to a STA. The AP shall always allow the TXOP owner to decide whether the TXOP should be terminated earlier than the previously granted end time, or it should be extended to a time that is within the TXOP limited. In other words, the AP shall not decide by itself whether and when to terminate or extend the current TXOP. As the TXOP owner, the STA shall ensure its operation is within the limit of the maximum TXOP duration allowed for its AC.

Reporting Buffer Size and the Time Required for Clearing the Buffer at STAs

FIG. 4 shows an example format for a QoS control field 400, according to an embodiment. In order for the AP to make right decisions on which STAs to poll for uplink transmissions, the AP needs to know the demand of transmission time from each STA. In one embodiment, the QoS Control field in the MAC header of a QoS data frame may be used for this purpose, which is different from the way the field is used in a legacy system, although it is used under the legacy HCCA channel access mechanism. In one embodiment, a STA uses the QoS Data frame format to deliver its UL traffic. This is because a QoS Control field is optional and only exists in QoS frames. To report the traffic situation, in one embodiment a STA may use either the TXOP Duration Requested subfield or the Queue Size subfield in the QoS Control field.

Note both QoS Data and QoS Null frames are capable of delivering the TXOP Duration Requested information and the Queue Size information to the AP, according to one or more embodiments. Therefore, if a STA is polled by the AP for UL transmission using a UTI method, and it has no data to send, it should send a QoS Null frame back to the AP with "0" in the Queue Size subfield or "0" in the TXOP Duration Requested subfield, according to one embodiment. This may be useful if a STA has been idle for a while (therefore its current queue status is not known to the AP) and the AP has no other STAs which have traffic to send.

In one embodiment, TXOP Duration Requested subfield values are not cumulative. A TXOP duration requested for a particular traffic identifier (TID) supersedes any prior TXOP duration requested for that TID. A value of 0 in the TXOP Duration Requested subfield may be used to cancel a pending unsatisfied TXOP request when its MAC service data unit (MSDU) is no longer queued for transmission, according to one embodiment. The TXOP duration requested is inclusive of the PHY and IFS overhead, and a STA should account for this when attempting to determine whether a given transmission fits within a specified TXOP duration.

In one embodiment, a UHT-capable AP is required to indicate whether it processes the TXOP request or queue size in the QoS Info field in the Probe Response, and (Re)Association Response frames. In one embodiment, APs shall process requests in at least one format. Also note that in the EDCA environment, TID fields are optional and they may be ignored, according to one embodiment.

Multiple-Frame Transmission in a TXOP

Figures 5, 6:
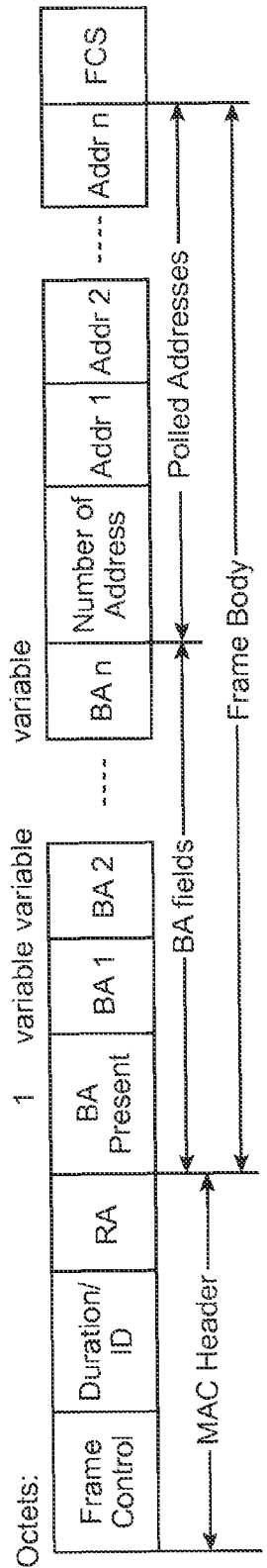
FIG. 5 shows an example format for a frame control field, according to an embodiment.
FIG. 6 shows a CF-Multi-Poll+ACK frame for UL MU-MIMO communication, according to an embodiment.

FIG. 5 shows an example format for a frame control field 500, according to an embodiment. In one embodiment, within the granted TXOP, the TXOP owner shall be able to transmit multiple PHY protocol data units (PPDUs) to the AP. To achieve this, in one embodiment the More Data subfield in the Frame Control field 500 in the MAC header is utilized.

The More Data subfield was originally created for an AP to inform a power-save STA that it has MAC data frames waiting to be delivered in its buffer so the STA should retrieve the frame before it goes back to doze mode. In one embodiment, for a UL MU-MIMO TXOP, the More Data subfield may be used by the TXOP owner to inform the AP that it has more data frame to be transmitted in the UL to the AP. In one embodiment, setting the More Data bit to "1" in a QoS Data frame indicates that the TXOP owner has more data frames to send to the AP. In one embodiment, setting the More Data bit to "0" in a QoS Data frame indicates this data frame is the last data frame the TXOP owner intended to transmit during this TXOP.

In one embodiment, upon receiving a data frame with the More Data subfield set to "1", the AP shall send a CF-Multi-Poll frame 600 (FIG. 6) to the TXOP owner and other STAs to poll for another round of UL transmission, if there is still time left (excluding the transmission time of the CF-Multi-Poll frame 600 and other overheads) within the originally requested TXOP. Note if all bits in the BA Present subfield (a bitmap) have a zero value, the CF-Multi-Poll+ACK frame is a pure CF-Multi-Poll frame 600. Otherwise, it may be used to acknowledge the previously received data frames, as well as to poll STAs for the next round of uplink transmission.

In one embodiment, although STAs other than the TXOP owner should also set the More Data subfield to reflect their transmission status, the information is only provided for the AP to determine whether they should be included in the next round of UL transmission; the information shall not affect the decision on whether to terminate or extend the current TXOP. For example, as long as the More Data subfield of the TXOP owner's QoS data frame is set to "0", the TXOP shall be terminated, even though the More Data subfields of one or more other STAs' QoS data frame are set to "1".

In one embodiment, in any UL transmission phase, if a STA is not able to finish transmission in the given time indicated in the Duration field of the CF-Multi-Poll frame 600, it should send a QoS Null frame with the QoS Control field reflecting the current buffer size and the TXOP duration required to empty its queue. Note the AP may select different sets of STAs in different UL phases for transmission, as long as the TXOP owner is always polled in each of the uplink phases. To achieve this, in one embodiment the AP simply changes the STA addresses in the CF-Multi-Poll frame 600.

In one embodiment, when an uplink transmission request is done by sending an RTS with special indication, a CTS frame can be used by the AP to poll multiple STAs for uplink transmission. In this case, the CTS frame may include addresses of multiple targeted STAs. However, a legacy CTS frame has only one RA (Receiver Address) field and hence cannot carry multiple addresses. According to one or more embodiments, said polling function may be achieved by sending a conventional CTS frame followed by a created CF-Multi-Poll frame, which contains the MAC addresses of STAs from which the AP is expected to receive uplink data from, or sending the newly created CF-Multi-Poll frame only.

FIG. 6 shows a CF-Multi-Poll+ACK frame for UL MU-MIMO communication, according to an embodiment. According to one embodiment, in this approach, a conventional (legacy or normal) CTS frame is first sent back from the AP to the UTR sender STA with the duration field set to the requested TXOP duration plus any control overheads. Because this conventional CTS does not contain the address list of the targeted STAs, another frame needs to be sent for this purpose according to an embodiment. In one example embodiment, a QoS CF-Multi-Poll frame 600 is employed by the AP, wherein said frame has a Data frame subtype for polling all the targeted STAs for uplink transmission.

In one embodiment, in the frame 600, the Duration field reflects the requested TXOP plus any overhead (e.g., a SIFS).

In one embodiment, the RA field contains the MAC address of the UTR sender. In one embodiment, the first field of the polled addresses, the Number of Address field, contains the number of additional receiver addresses (other than the UTR sender STA's address) carried in the frame body. For example, if the value of the Number of Address field equals to 4, then the frame body will contain 4 additional receiver addresses (n=4). In one embodiment, the frame 600 may contain other fields in the MAC Header, such as QoS Control and HT/UHT Control fields. Although frame 600 is a data frame, it is transmitted at one of the rates in the BSSBasicRateSet parameter in order to set the NAV of all STAs that are not being polled, according to one embodiment.

According to one embodiment, in this approach, the AP sends out the QoS CF-Multi-Poll frame 600 only as the response to a UTR frame, without sending the CTS frame first. In this case the frame exchange sequence becomes RTS/CF-Multi-Poll/Uplink Data. Although QoS CF-Multi-Poll is a data frame, it is transmitted at one of the rates in the BSS-BasicRateSet parameter in order to set the NAV of all STAs that are not being polled, according to one embodiment.

Figure 7:
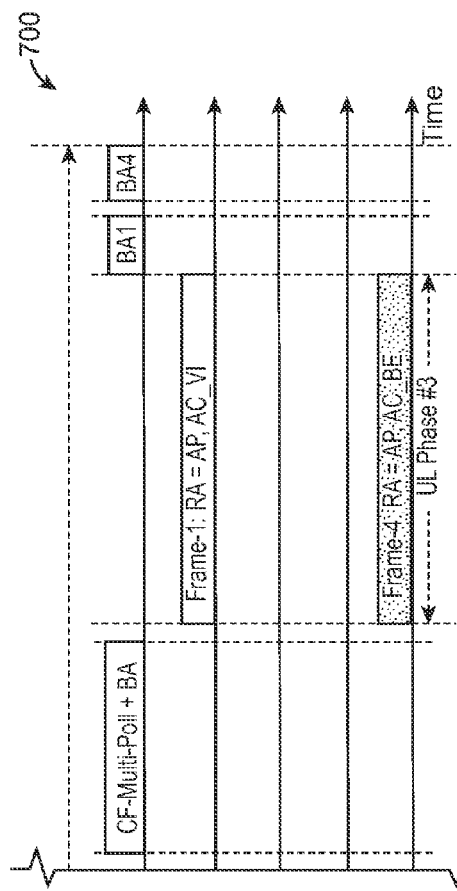
FIG. 7 shows an example multiple frame transmission process for UL MU-TXOP communication, according to an embodiment.

FIG. 7 shows an example multiple frame transmission process 700 for UL MU-TXOP communication, according to an embodiment. In one embodiment, in process 700 it is assumed that the AP may receive data frames from up to 3 STAs at one time. In the first uplink phase, transmissions were polled from STA-1, STA-2 and STA-3. In the second uplink phase, transmissions were polled from STA-1, STA-2 and STA-4, indicating a change of uplink STAs. In one embodiment, in process 700 the CF-Multi-Poll frames are also used to acknowledge the previously transmitted frames.

Early Termination of a TXOP

Figure 8:
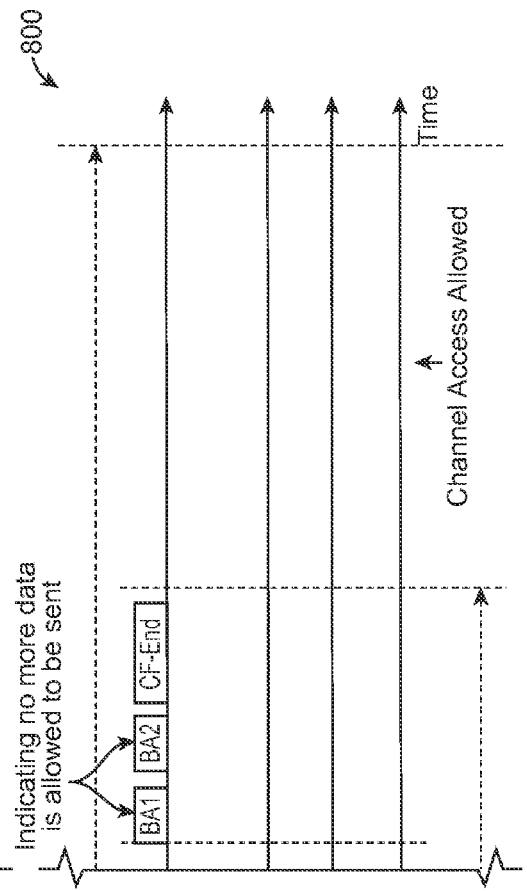
FIG. 8 shows an example early termination of UL MU-TXOP communication with CF-End frame, according to an embodiment.

FIG. 8 shows an example early termination process 800 for UL MU-TXOP communication with CF-End frame, according to an embodiment. In the case the TXOP owner completes all uplink transmissions before the requested TXOP duration ends, the TXOP owner can indicate this to the AP by one of the following embodiments in the last QoS data frame it transmits: setting the More Data subfield to "0", setting the TXOP Duration Requested subfield in the QoS Control field to "0", or setting the duration/ID field to cover only the response frame.

In one embodiment, upon receiving a QoS data frame with one of the above setting indications, the AP shall first send out the acknowledgement frames. In one embodiment, in the acknowledgement frames, the AP shall indicate to the STAs that no UL transmission is allowed. In one example embodiment, this may be done by setting the duration/ID field of the acknowledgement frames to zero. After that, the AP shall check whether the TXOP duration left is longer than the time to transmit a CF-End frame. In one embodiment, if there is enough time, the AP shall send out a CF-End frame to terminate the TXOP so STAs may start competing for the channel again.

Figure 9:
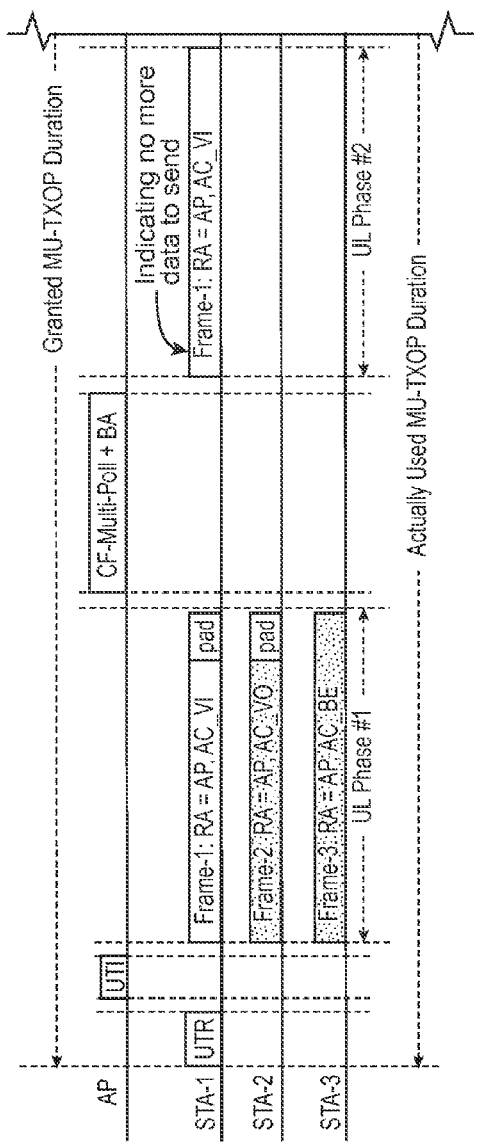
FIG. 9 shows an example early termination of UL MU-TXOP communication with CF-End+CF-ACK frame, according to an embodiment.

FIG. 9 shows an example 900 of early termination of UL MU-TXOP communication with CF-End+CF-ACK frame, according to an embodiment. In the case the TXOP owner is the only STA that transmits in the last uplink phase, in one embodiment the AP may transmit a CF-End+CF-Ack frame to achieve both goals; acknowledging the receipt of the data frame and terminating the TXOP.

In one embodiment, if a polled QoS STA has MPDUs available to send but the frames are too long to be transmitted within the rest of the TXOP duration, the QoS STA shall send a QoS (+) Null frame. In this case the QoS (+)Null frame shall have a QoS Control field that contains a nonzero queue size needed to send the MPDU that is ready for transmission. In one embodiment, when a queue size is transmitted, the AP shall combine the queue size information with the rate of the received QoS (+)Null frame to determine the required size of the requested TXOP.

Extension of a TXOP

Figure 10:
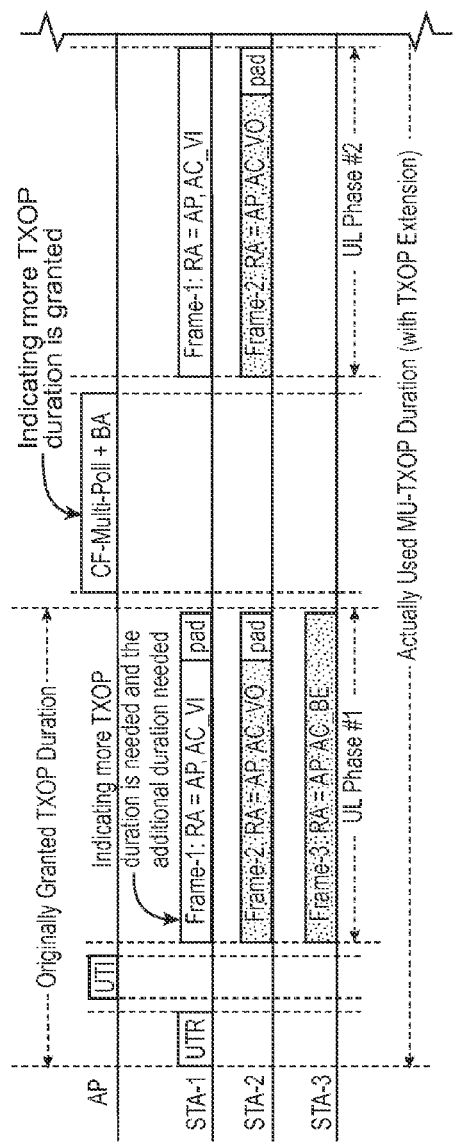
FIG. 10 shows an example TXOP extension in UL MU-MIMO transmissions, according to an embodiment.

FIG. 10 shows an example 1000 TXOP extension in UL MU-MIMO transmissions, according to an embodiment. In one embodiment, in the case the TXOP owner cannot finish transmission within the duration it originally requested and the TXOP limit of that AC has not been reached, the TXOP owner is allowed to request an extension of the current TXOP. To achieve this, in one embodiment, the TXOP owner indicates to the AP its intent to extend the current TXOP by:

setting the More Data subfield to "1",
setting the TXOP Duration Requested subfield in the QoS Control field to the new requested duration, and
setting the duration/ID field to cover the duration it needs to empty its AC queue, in the QoS data frames it transmits.

In one embodiment, upon receiving a QoS data frame with both the More Data subfield and the TXOP Duration Requested subfield set to a non-zero value, the AP sends out a new polling frame (e.g. the CF-Multi-Poll+ACK frame) with the Duration field set to the duration requested by the TXOP owner plus any overheads. In one embodiment, upon receiving the indication frame sent from the AP, all STAs in the BSS, including both legacy and UHT-capable STAs, shall set their NAVs accordingly reflect the fact that the TXOP has been extended.

TXOP Structure and Timing

In one embodiment, the UTI frame and the CF-Multi-Poll+Ack frame contain a TXOP limit in their QoS Control field. In one embodiment, a UL MU-MIMO TXOP is protected by the NAV set by the Duration field of the UTI frame or the CF-Multi-Poll+Ack frame. Within an UL MU-MIMO TXOP, the TXOP owner STA may initiate the transmission of one or more frame exchange sequences, with all such sequences nominally separated by a SIFS interval. In one embodiment, the STAs shall not transmit any frames unless the transmissions and any acknowledgments or other immediate responses expected from the AP are able to complete prior to the end of the remaining TXOP duration. All transmissions, including the response frames, within the UL MU-MIMO TXOP are considered to be the part of the TXOP, and the AP shall account for these when granting the TXOP, according to one or more embodiments.

Network Allocation Vector (NAV) Operation During a TXOP

In one embodiment, an UTR frame shall set the NAVs of all STAs that receive it. In one embodiment, a UTI frame shall update the NAVs of all STAs except those being polled by the UTI frame, whose NAVs will be reset to allow uplink transmission. In one embodiment, a CF-Multi-Poll+Ack frame shall update the NAVs of all STAs except those being polled by the UTI frame, whose NAVs will be reset to allow uplink transmission.

In one embodiment, a STA resets its NAV when it receives a CF-End or CF-End+CF-Ack frame. In one embodiment, when a STA receives an UTI frame or a CF-Multi-Poll+Ack frame containing the BSSID of the BSS in which the STA is associated, that STA shall update the NAV if necessary.

Figure 11:
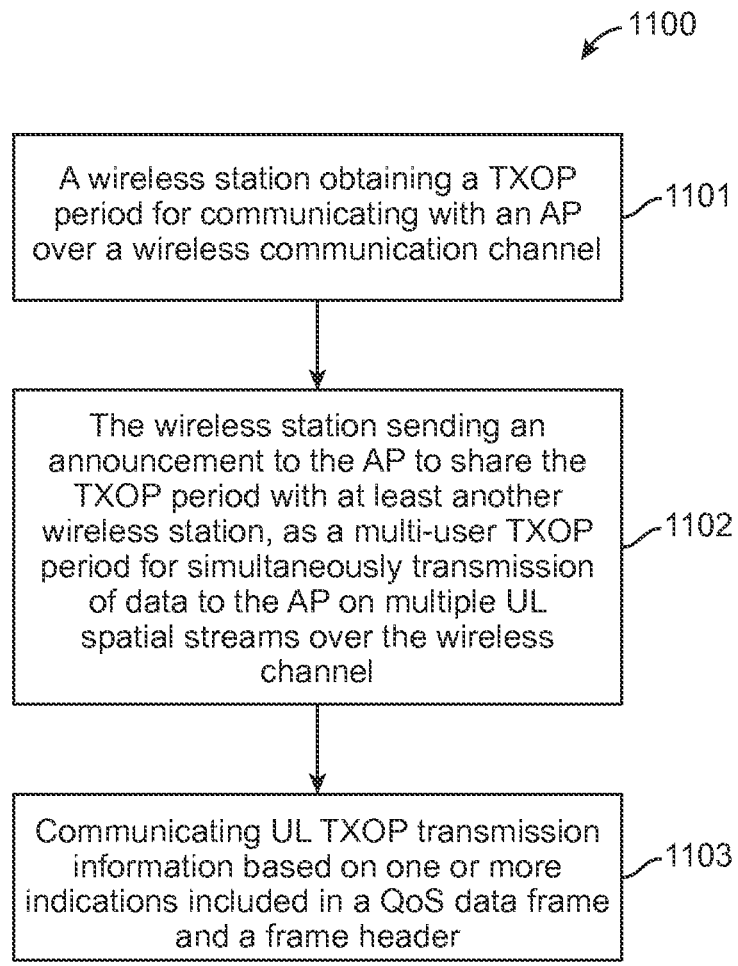
FIG. 11 shows a flow diagram for communicating UL TXOP transmission information, according to an embodiment.

FIG. 11 shows a flow diagram 1100 for communicating UL TXOP transmission information, according to an embodiment. In one embodiment, in block 1101 a wireless station obtains a TXOP period for communicating with an AP over a wireless communication channel. In one embodiment, in block 1102 the wireless station sends an announcement to the AP to share the TXOP period with at least another wireless station, as a multi-user TXOP period for simultaneously transmitting data from said wireless stations to the AP on multiple UL spatial streams over the wireless channel. In one embodiment, in block 1103 UL TXOP transmission information is communicated based on one or more indications included in a QoS data frame and a frame header. In one embodiment, the wireless stations use the QoS data frame for delivering UL traffic and a QoS control field of the QoS data frame for indicating one or more of station buffer size and time required for clearing the station buffer.

In one embodiment, the stations use either a TXOP Duration Requested sub-field or a Queue Size sub-field in the QoS control field for indications of one or more of station buffer size and time required for clearing the station buffer for informing the AP to determine which stations to poll for UL transmissions. In one embodiment, in process 1100, a More Data sub-field in a frame-control field of the frame header is used to inform the AP whether more data frames are to be transmitted in the UL transmission during a next TXOP period, wherein the frame header comprises a MAC header.

In one embodiment, in process 1100 communicating UL TXOP transmission information comprises indicating early termination of a TXOP period in a last received QoS data frame that a TXOP period owner transmits based on one or more of:

setting the More Data sub-field to 0, setting the TXOP Duration Requested sub-field in a QoS control field to 0, and setting the Duration/ID field to cover only a response frame.

In one embodiment, in process 1100 communicating UL TXOP transmission information further comprises requesting an extension of a TXOP period transmission by the TXOP period owner if required to complete a transmission by indicating to the AP by the TXOP period owner intent to extend a current TXOP period based on one or more of:

setting the More Data sub-field to 1, setting the TXOP Duration Requested sub-field in the QoS control field to a new requested duration, and setting the Duration/ID field to cover duration required to empty an AC queue.

As is known to those skilled in the art, the aforementioned example architectures described above, according to one or more embodiments, may be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, one or more embodiments may take the form of an entirely hardware embodiment, an entirely software embodiment or an embodiment containing both hardware and software elements.

Figure 12:
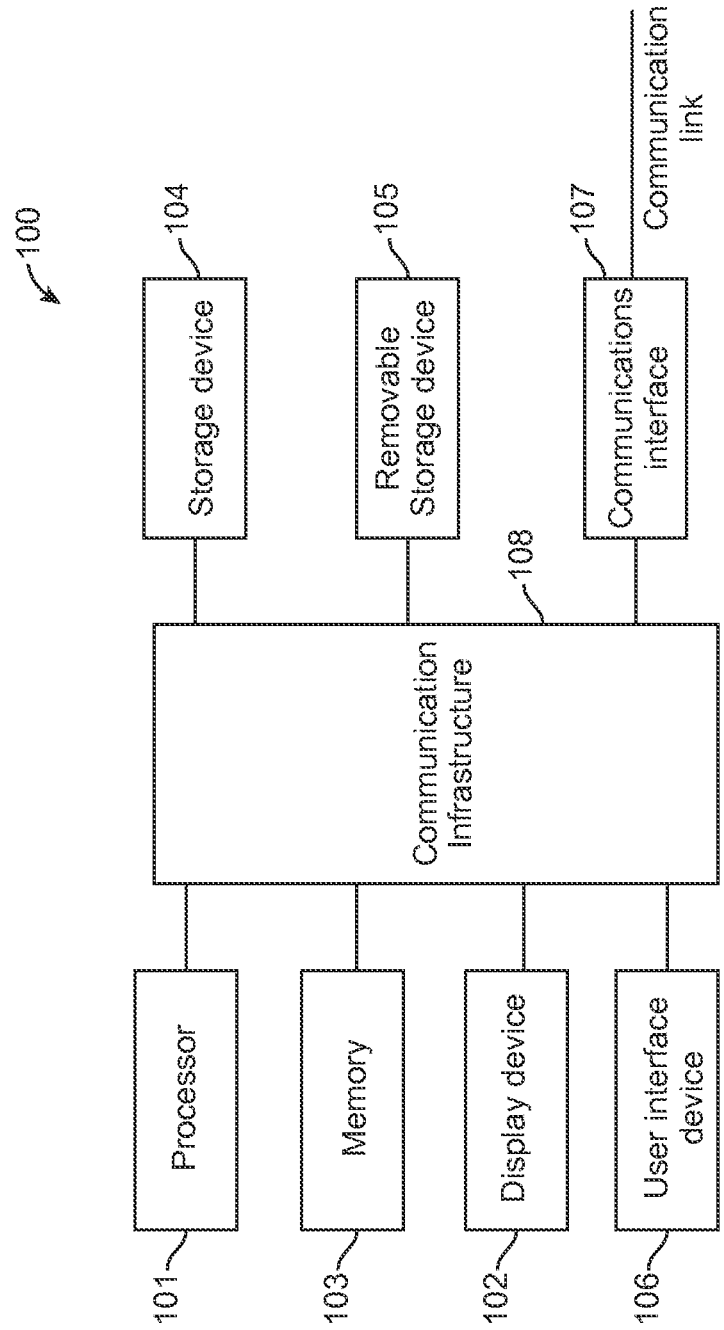
FIG. 12 is an exemplary high-level block diagram showing an information processing system comprising a computer system useful for implementing disclosed embodiments.

FIG. 12 is a high-level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method of wireless communication, comprising:
a wireless station obtaining a transmission opportunity (TXOP) period for communicating with a wireless access point (AP) over a wireless communication channel;
the wireless station sending an announcement to the wireless AP to share the TXOP period with at least another wireless station, as a multi-user TXOP period for simultaneously transmitting data from the wireless station and the at least another wireless station to the wireless AP on multiple uplink (UL) spatial streams over the wireless channel;
receiving a UL transmission indication (UTI) frame by the wireless station along with addresses of target wireless stations allowed to transmit to the wireless AP in a UL phase and allowed UL transmission time for each target wireless station; and
communicating UL transmission information in at least one indication included in a quality of service (QoS) data frame and a frame header.

2. The method of claim 1, wherein the wireless station uses the QoS data frame for delivering UL traffic and a QoS control field of the QoS data frame for indicating at least one of a size of a wireless station buffer and time required for clearing the wireless station buffer.

3. The method of claim 2, wherein the wireless station uses one of a TXOP Duration Requested sub-field or a Queue Size sub field in the QoS control field for indications of at least one of the size of the wireless station buffer and the time required for clearing the wireless station buffer for informing the wireless AP to determine wireless stations in a wireless network to poll for UL transmissions.

4. The method of claim 3, further comprising:
UL data transmission in the wireless network comprising a wireless local area network (WLAN), wherein the data frames are organized into access categories in order of transmission priority;
contending for channel access by performing Enhanced Distributed Channel Access (EDCA) to provide QoS for a data frame in a high priority access category;
the wireless station receiving downlink transmission of an acknowledgment from the wireless AP in response to at least one UL data frames, wherein:
the sending of the announcement comprises transmitting a UL transmission request (UTR); and
the UL data transmission comprises UL multi-user multiple-input-multiple-output (UL MU-MIMO) communication to the wireless AP.

5. The method of claim 4, further comprising:
using a More Data sub-field in a frame-control field of the frame header to inform the wireless AP whether more data frames are to be transmitted in the UL transmission during a next TXOP period, wherein the frame header comprises a media access control (MAC) header.

6. The method of claim 5, wherein transmitting a UTR comprises transmitting a UTR control frame, the UTR control from comprising:
a Duration/ID field indicating a requested TXOP duration and any control overhead;
a receiver address (RA) field including the MAC address of the wireless AP;
a Transmitter Address (TA) field including the MAC address of the wireless station owner of the TXOP; and
an Access Category (AC) field in the frame body indicating the AC that obtains a TXOP.

7. The method of claim 6, wherein communicating UL TXOP transmission information comprises indicating early termination of a TXOP period in a last received QoS data frame that a TXOP period owner transmits based on at least one of:
setting the More Data sub-field to 0,
setting the TXOP Duration Requested sub-field in a QoS control field to 0, and
setting the Duration/ID field to cover only a response frame.

8. The method of claim 7, wherein communicating UL TXOP transmission information further comprises:
requesting an extension of a TXOP period transmission by the TXOP period owner if required to complete a transmission by indicating to the wireless AP by the TXOP period owner intent to extend a current TXOP period based on at least one of:
setting the More Data sub-field to 1,
setting the TXOP Duration Requested sub-field in the QoS control field to a new requested duration, and
setting the Duration/ID field to cover duration required to empty an AC queue.

9. The method of claim 8, wherein a UTI frame and a CF-Multi-Poll frame comprises a TXOP period limit, and a UL MU-MIMO TXOP is protected by a network allocation vector (NAV) set by the Duration field of the UTI frame or the CF-Multi-Poll+Ack frame.

10. The method of claim 9, wherein NAV operation during a TXOP period comprises:
a UTR frame setting the NAVs of all wireless stations that receive the UTR frame;
a UTI frame updating the NAVs of all wireless stations except those stations being polled by the UTI frame, whose NAVs are reset to allow UL transmission;
a CF-Multi-Poll+Ack frame updating the NAVs of all wireless stations except those being polled by the UTI frame, whose NAVs Are reset to allow UL transmission; and
the wireless station resetting its NAV upon receiving a CF-End or CF-End+CF-Ack frame.

11. The method of claim 10, wherein:
upon the wireless station receiving a UTI frame or a CF-Multi-Poll+Ack frame containing a basic service set identifier (BSSID) of a basic service set (BSS) in which the wireless station is associated, the wireless station updates the NAV if necessary.

12. A wireless station, comprising:
a Physical Layer (PHY) configured to provide wireless communication over a wireless communication channel;
Media Access Control (MAC) layer; and
a channel access processor configured to obtain a transmission opportunity period (TXOP) to communicate with a wireless access point (AP) over the wireless communication channel, wherein the channel access processor is configured to send an announcement to the wireless AP to share the transmission opportunity period with at least another wireless station as a multi-user transmission opportunity period to simultaneously transmit data from the wireless station and the at least another wireless station to the wireless AP on multiple uplink (UL) spatial streams over the wireless channel, to receive a UL transmission indication (UTI) frame along with addresses of target wireless stations allowed to transmit to the wireless AP in a UL phase and allowed UL transmission time for each target wireless station, and to communicate transmission information in at least one indication included in a quality of service (QoS) data frame and a frame header.

13. The wireless station of claim 12, wherein the wireless station is configured to use the QoS data frame to deliver UL traffic and a QoS control field of the QoS data frame to indicate at least one of a size of a wireless station buffer and time required for clearing the wireless station buffer.

14. The wireless station of claim 13, wherein the wireless station is configured to use one of a TXOP Duration Requested sub-field or a Queue Size sub field in the QoS control field to indicate at least one of the wireless station buffer size and time required for clearing the wireless station buffer to inform the wireless AP to determine which wireless stations in a wireless local area network (WLAN) to poll for UL transmissions.

15. The wireless station of claim 14, wherein:
the channel access processor is configured to provide UL data transmission in the WLAN;
QoS data frames are organized into access categories in order of transmission priority;
the channel access processor is configured to contend for channel access to perform Enhanced Distributed Channel Access (EDCA) to provide QoS for a data frame in a high priority access category;
the wireless station is configured to receive downlink transmission of an acknowledgment in response to at least one UL data frames,
the announcement comprises a UL transmission request (UTR); and
the UL data transmission comprises UL multi-user multiple-input-multiple-output (UL MU-MIMO) communication from target wireless stations to the wireless AP.

16. The wireless station of claim 15, wherein the channel access processor is configured to use a More Data sub-field in a frame-control field of the frame header to inform the wireless AP whether more data frames are to be transmitted in the UL transmission during a next TXOP period, and the frame header comprises a MAC header.

17. The wireless station of claim 16, wherein the channel access processor indicates early termination of a TXOP period in a last received QoS data frame that a TXOP period owner transmits to perform at least one of:
set the More Data sub-field to 0,
set the TXOP Duration Requested sub-field in a QoS control field to 0, and
set a Duration/ID field to cover only a response frame.

18. The wireless station of claim 17, wherein an extension of a TXOP period transmission is requested by the TXOP period owner if required to complete a transmission by indicating to the wireless AP by the TXOP period owner intent to extend a current TXOP period based on the channel access processor being configured to perform at least one of:
set the More Data sub-field to 1,
set the TXOP Duration Requested sub-field in the QoS control field to a new requested duration, and
set the Duration/ID field to cover duration required to empty an Access Category (AC) queue.

19. The wireless station of claim 18, wherein the channel access processor is configured to provide network allocation vector (NAV) operations during a TXOP period, and to use: a UTR frame to set the NAVs of all wireless stations that receive the UTR frame, the UTI frame to update the NAVs of all wireless stations except those wireless stations being polled by the UTI frame, whose NAVs are reset to allow UL transmission, a CF-Multi-Poll+Ack frame to update the NAVs of all wireless stations except those being polled by the UTI frame, whose NAVs are reset to allow UL transmission, and another wireless station to reset its NAV upon receiving a CF-End or CF-End+CF-Ack frame.

20. The wireless station of claim 19, wherein:
upon the wireless station receiving the UTI frame or a CF-Multi-Poll+Ack frame containing a basic service set identifier (BSSID) of a basic service set (BSS) in which the wireless station is associated, the wireless station is configured to update the NAV if necessary.

21. A wireless access point (AP), comprising:
a Physical Layer (PHY) configured to provide wireless communication over a wireless communication channel;
a Media Access Control (MAC) layer configured to manage simultaneous transmissions from multiple wireless stations to the wireless AP on multiple uplink (UL) spatial streams during a multi-user transmission opportunity period over a wireless channel; and
a channel access processor configured to transmit a UL transmission indication (UTI) frame to the multiple wireless stations along with addresses of target wireless stations allowed to transmit to the wireless AP in a UL phase and allowed UL transmission time for each target wireless station;
wherein the wireless AP is configured to receive transmission information in at least one indication included in a quality of service (QoS) data frame and a frame header.

22. The wireless AP of claim 21, wherein the wireless AP is configured to receive UL traffic and a QoS control field of a QoS data frame to indicate at least one of a size of a wireless station buffer and time required for clearing the wireless station buffer.

23. The wireless AP of claim 22, wherein the wireless station is configured to use one of a TXOP Duration Requested sub-field or a Queue Size sub field in the QoS control field for indications of at least one of the size of the wireless station buffer and time required for clearing the wireless station buffer to inform the wireless AP to determine which wireless stations in a wireless local area network (WLAN) to poll for UL transmissions.

24. The wireless AP of claim 23, wherein:
the wireless AP comprises a channel access processor that provides UL data transmission in the WLAN;
QoS data frames are organized into access categories in order of transmission priority;
the wireless AP is configured to contend for channel access by being configured to perform Enhanced Distributed Channel Access (EDCA) to provide QoS for a data frame in a high priority access category (AC);
the wireless AP is configured to perform downlink transmission of an acknowledgment to each wireless station in response to one or more UL data frames;
the announcement comprises a UL transmission request (UTR); and
the UL data transmission comprises UL multi-user multiple-input-multiple-output (UL MU-MIMO) communication from target wireless stations to the wireless AP.

25. The wireless AP of claim 24, wherein the channel access processor uses a More Data sub-field in a frame-control field of the frame header to inform the wireless AP whether more data frames are to be transmitted in the UL transmission during a next TXOP period, and the frame header comprises a MAC header.

26. The wireless AP of claim 25, wherein the channel access processor indicates early termination of a TXOP period in a last received QoS data frame that a TXOP period owner transmits based on being configured to perform at least one of:
- set the More Data sub-field to 0,
- set the TXOP Duration Requested sub-field in a QoS control field to 0, and
- set a Duration/ID field to cover only a response frame.

27. The wireless AP of claim 26, wherein an extension of a TXOP period transmission is requested by the TXOP period owner if required to complete a transmission by indicating to the wireless AP by the TXOP owner intent to extend a current TXOP period based on the channel access processor being configured to perform at least one of:
- set the More Data sub-field to 1,
- set the TXOP Duration Requested sub-field in the QoS control field to a new requested duration, and
- set the Duration/ID field to cover duration required to empty an AC queue.

28. The wireless AP of claim 27, wherein:
- the channel access processor is configured to provide network allocation vector (NAV) operations during a TXOP period; and
- the channel access processor is configured to use: a UTR frame to set the NAVs of all wireless stations that receive the UTR frame, the UTI frame to update the NAVs of all wireless stations except those wireless stations being polled by the UTI frame, whose NAVs are reset to allow UL transmission, a CF-Multi-Poll+Ack frame to update the NAVs of all wireless stations except those being polled by the UTI frame, whose NAVs are reset to allow UL transmission, and a wireless station to reset its NAV upon receiving a CF-End or CF-End+CF-Ack frame.

29. The wireless AP of claim 28, wherein:
upon transmitting the UTI frame or a CF-Multi-Poll+Ack frame to a wireless station, causing that wireless station to update the NAV if necessary, and the UTI frame or the CF-Multi-Poll+Ack frame contains a basic service set identifier (BSSID) of a basic service set (BSS) in which that wireless station is associated.

* * * * *